United States Patent [19]

Rossi et al.

[11] Patent Number: 4,510,324

[45] Date of Patent: Apr. 9, 1985

[54] MONOMERIC DISULFONIMIDES

[75] Inventors: Robert D. Rossi, Levittown, Pa.; Dilip K. Ray-Chaudhuri, Bridgewater, N.J.

[73] Assignee: National Starch and Chemical Corp., Bridgewater, N.J.

[21] Appl. No.: 489,665

[22] Filed: Apr. 28, 1983

[51] Int. Cl.³ .............................................. C07C 143/78
[52] U.S. Cl. ....................................... 564/82; 526/288
[58] Field of Search .......................................... 564/82

[56] References Cited

U.S. PATENT DOCUMENTS

| 3,052,656 | 9/1962 | Groene et al. | 260/78.5 |
| 4,215,209 | 6/1980 | Ray-Chaudhuri et al. | 526/292 |
| 4,243,584 | 1/1981 | Sommer et al. | 564/82 X |

FOREIGN PATENT DOCUMENTS

| 855706 | 11/1952 | Fed. Rep. of Germany | 564/82 |
| 867395 | 2/1953 | Fed. Rep. of Germany | 564/82 |
| 874446 | 4/1953 | Fed. Rep. of Germany | 564/82 |
| 1265157 | 4/1968 | Fed. Rep. of Germany | 564/82 |

OTHER PUBLICATIONS

Die Makromolekulare Chemie 100, (1967) 59–65.

Primary Examiner—Thomas A. Waltz
Attorney, Agent, or Firm—Edwin M. Szala; Eller T. Dec

[57] ABSTRACT

The invention provides disulfonimide compounds of the general formula

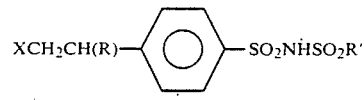

wherein X is bromine, chlorine or iodine; R is hydrogen or methyl; and R' is alkyl, aryl or substituted aryl. The compounds are useful as activators for anaerobic adhesive compositions and also as intermediates in the preparation of monomers of the general formula

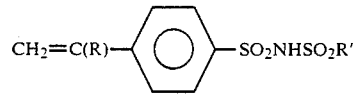

wherein R and R' are as defined above. The monomers are polymerizable to form homo- and copolymers useful in the photographic industry as well as in formulating anaerobic adhesive compositions.

4 Claims, No Drawings

MONOMERIC DISULFONIMIDES

The present invention relates to monomeric disulfonimide compounds. In particular, the invention relates to compounds having the general formula

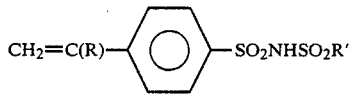

wherein R is hydrogen or methyl and R' is alkyl, aryl, or substituted aryl.

The homo- and copolymerizable monomers, containing a sulfonimido group, i.e. $-SO_2NHSO_2-$, are useful in a variety of applications in the photographic industry as well as for polymerizable activators in anaerobic adhesive compositions.

Also disclosed herein are novel compounds of the general formula

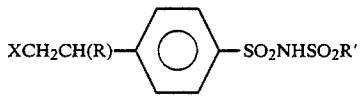

where X is bromine, chlorine or iodine. These isolatable compounds are formed as intermediates during the preparation of the monomers described above and are also useful as activators for anaerobic adhesive systems.

The preparation of the monomer is generally carried out in a multi-step reaction. In the first step, a phenylalkyl-halide is reacted with an excess of a halosulfonic acid after which the resultant product is reacted with ammonia to form a sulfonamide. The latter two reactions are known in the art and any conventional techniques and/or reagents may be utilized. The resulting sulfonamide is then reacted with an alkyl or aryl sulfonyl chloride followed by acidification to form a halo-disulfonimide. Although any alkyl or aryl sulfonyl chloride could be used, those generally available, and hence preferred from a commercial viewpoint, include methanesulfonyl chloride, ethanesulfonyl chloride, isopropylsulfonyl chloride, butanosulfonyl chloride, benzenesulfonyl chloride, para-toluenesulfonyl chloride, and 2-mesitylenesulfonyl chloride. This novel intermediate may be used directly in the subsequent reaction if desired or may be isolated in crystal form. If the reaction is to be continued to form the monomers of the present invention, the halo-disulfonimide intermediate is subjected to dehydrohalogenation to form the monomeric disulfonimide.

The following equations are representative of a typical reaction sequence.

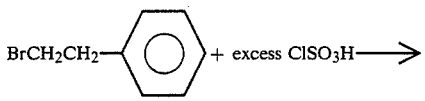

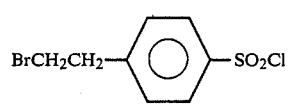

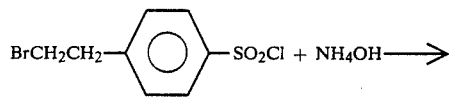

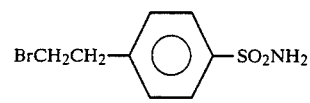

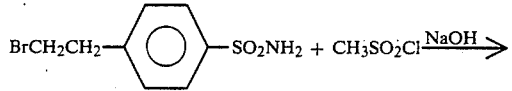

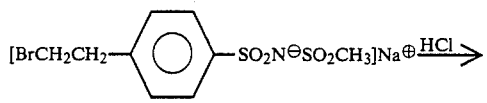

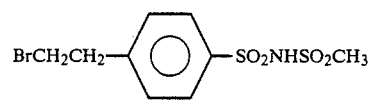

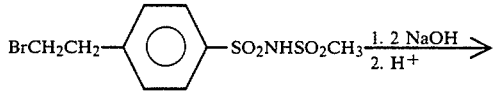

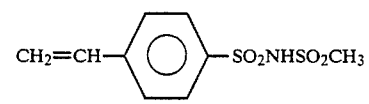

It will be recognized that a variety of other reagents may be used to produce corresponding monomeric disulfonimides characterized by the presence of different substitutent groups.

In addition to being copolymerizable with conventional acrylate and methacrylate monomers so as to serve as a polymerizable activator for anaerobic adhesives, the resultant monomers may also be homo- or co-polymerized using conventional solution or emulsion techniques well known to those skilled in the art. Particularly useful as comonomers herein are maleic anhydride and its derivatives as well as the aromatic vinyl compounds such as styrene and the derivative thereof, e.g. alphamethyl styrene and vinyl toluene.

The following examples are presented to illustrate but not to restrict the present invention. Parts and percentages are by weight unless otherwise noted.

EXAMPLE I

This example illustrates the preparation of N-mesyl-4-vinylbenzenesulfonamide.

A 2-liter multi-necked round bottom flask fitted with an mechanical stirrer (equipped with a glass stir rod and teflon paddle), reflux condenser, pressure equalizing addition funnel and thermometer was maintained under a sweep of argon. The system was vented to a trap containing 50% sodium hydroxide solution. The flask was charged with 626.4 g (5.4 mol) of chlorosulfonic acid, to this was added, dropwise, 200 g (1.08 mol) of phenyl ethyl bromide at such a rate as to maintain the reaction temperature below 27° C. with external ice-bath cooling. Upon complete addition, the mixture was stirred an additional hour and then cautiously poured over a large excess of ice to precipitate the crude sulfonyl chloride. Most of the ice water was decanted and the product dissolved in approximately one-liter of toluene. This toluene solution of 4-(2-bromethyl) benzenesulfonyl chloride was dried over anhydrous magnesium sulfate, filtered and used without further purification.

A 3-liter multi-necked round bottomed flask equipped as above was also maintained under a positive atmosphere of argon. The flask was charged with the toluene solution of 4-(2-bromoethyl) benzenesulfonyl chloride, cooled in an ice bath and 200 ml of 58% ammonium hydroxide introduced dropwise. Upon complete addition, the mixture was brought to between 50°–60° C. for 1.5 hrs. The mixture was cooled to room temperature and the crude sulfonamide collected and dried on a Buchner funnel to yield 264 g (1 mol, 93% based on phenyl ethyl bromide) of 4-(2-bromoethyl)benzenesulfonamide which was used without further purification.

A 500 ml multi-necked round bottomed flask equipped with a mechanical stirrer, thermometer, glass electrode connected to a suitable pH meter and two 60 ml pressure equalizing addition funnels, was charged with 200 ml of distilled water and 40 g (0.15 mol) of the crude 4-(2-bromoethyl)benzenesulfonamide. The slurry was cooled to 10° to 15° C. with an ice-water bath and sufficient 25% sodium hydroxide added from one of the addition funnels to bring the pH between 12 and 12.5. Through the second funnel, dropwise addition of 44 g (0.386 mol) methanesulfonyl chloride was introduced at such a rate as to maintain the temperature of the slurry between 10°–15° C. and concurrently 25% sodium hydroxide was added to maintain a pH of 12–12.5. Upon complete addition of the methanesulfonyl chloride, the slurry was stirred at 10° C. (pH 12) for ½ hour, brought to room temperature and made slightly acidic (pH 5) with concentrated hydrochloric acid. At this point any unreacted starting material was filtered and the filtrate cooled in an ice-water bath to 10° C. With vigorous stirring, the filtrate was made strongly acidic with concentrated hydrochloric acid, and the crude product collected on a Buchner funnel and dried in a vacuum oven at 50° C. overnight to give 40 g (0.12 mol), 80% yield based on 4-(2-bromoethyl) benzenesulfonamide of N-mesyl-4(2-bromoethyl)benzenesulfonamide. Recrystallization of a small portion from toluene gave a product of melting point 141°–144° C.; neutralization equivalent of 341.32 (theory 342). The elemental analysis and the calculated composition of $C_9H_{12}NO_4S_2Br$ are set forth below:

| Compn. by % | C | H | N | S |
|---|---|---|---|---|
| Analysis | 32.29 | 3.51 | 3.94 | 18.70 |
| Calculation | 31.58 | 3.51 | 4.09 | 18.71 |

A 500 ml multi-necked round bottomed flask fitted with a reflux condenser, thermometer and mechanical stirrer was then charged with 120 g (0.35 mol) of the crude N-mesyl-4 (2-bromoethyl) benzenesulfonamide, 112.8 ml (0.70 mol) of 25% sodium hydroxide solution and 150 ml of distilled water. The solution was heated to 70° C. for ¾ hr, cooled in an ice-water bath to approximately 10° C. and then made strongly acidic with concentrated hydrochloric acid. The resulting mixture was stirred for 1 hour and the precipatated product collected by filtration. The crude product, 78 g (0.30 mol) of N-mesyl-4-vinylbenzenesulfonamide was dissolved in warm toluene (ca. 55° C.), filtered to remove insolubles, and allowed to crystallize at freezer temperatures to yield 45 g (0.17 mol, 50%) pure monomer having a melting point of 98°–100° C. and a neutralization equivalent of 259.92 (theory 261); the elemental analysis and the calculated composition of $C_9H_{11}NO_4S_2$ are given below:

| Compn. by % | C | H | N | S |
|---|---|---|---|---|
| Analysis | 41.08 | 4.41 | 5.19 | 23.47 |
| Calculation | 41.38 | 4.21 | 5.36 | 24.52 |

EXAMPLE II

A procedure similar to that described in Example I was used to prepare the N-mesyl-4-vinylbenzenesulfonamide using phenyl ethyl chloride as a starting material and producing as an intermediate N-mesyl-4-(2-chloroethyl)benzenesulfonamide. Analysis of obtained vs. theoretical values for the intermediate are as follows: melting point: 149°–151° C.; neutralization equivalent: 302.05 (theory 297).

| Compn. by % | C | H | N | S | Cl |
|---|---|---|---|---|---|
| Analysis | 36.42 | 3.99 | 4.75 | 20.55 | 12.57 |
| Evaluation | 36.36 | 4.04 | 4.71 | 21.55 | 11.78 |

The N-mesyl-4-(2-chloroethyl)-benzenesulfonamide intermediate was then reacted with sodium hydroxide and water as in Example I to yield 0.28 mols of the N-mesyl-4-vinylbenzenesulfonamide.

EXAMPLE III

As an additional variation of the reaction sequence, the 4-(2-bromoethyl) benzenesulfonamide produced as in Example I was reacted with benzenesulfonyl chloride and sodium hydroxide and then acidified to produce N-benzenesulfonyl-4-(2-bromoethyl) benzenesulfonamide. Recrystallization of a small portion from toluene gave a white solid, having a melting point of 148°–150° C. and a neutralization equivalent of 405 (theory 404).

| Compn. by % | C | H | N | S |
|---|---|---|---|---|
| Analysis | 41.69 | 3.19 | 3.52 | 16.11 |
| Calculated | 41.58 | 3.46 | 3.46 | 15.84 |

The resultant intermediate was then dehydrohalogenated to produce N-benzenesulfonyl-4-vinylbenzenesulfonamide. Recrystallization of a small portion from toluene gave a white solid of melting point 145°–147° C.; and neutralization equivalent of 325.5 (theory 323).

| Compn. by % | C | H | N | S |
|---|---|---|---|---|
| Analysis | 51.65 | 3.95 | 3.61 | 18.77 |
| Calculated | 52.01 | 4.02 | 4.33 | 19.81 |

Now that the preferred embodiments of the present invention have been described in detail, various modifications and improvements thereon will become readily apparent to those skilled in the art. Accordingly, the spirit and scope of the present invention is to be limited

We claim:
1. A compound of the formula:

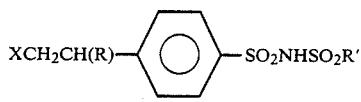

wherein X is bromine, chlorine, or iodine; R is hydrogen or methyl and R' is alkyl, aryl, toluene or mesitylene.

2. The compound of claim 1 wherein X is bromine, R is hydrogen, and R' is methyl.

3. The compound of claim 1 where X is chlorine, R is hydrogen and R' is methyl.

4. The compound of claim 1 where X is bromine, R is hydrogen and R' is benzene or toluene or mesitylene.